(12) United States Patent
Dreibholz et al.

(10) Patent No.: US 7,469,169 B2
(45) Date of Patent: Dec. 23, 2008

(54) METHOD FOR CONTROL OF INPUT POWER DISTRIBUTION IN A MOTOR VEHICLE WITH HYBRID ENGINE DRIVE

(75) Inventors: Ralf Dreibholz, Meckenbeuren (DE); Friedrich Tenbrock, Langenargen (DE); Gerd Frotscher, Friedrichshafen (DE); Johannes Kaltenbach, Friedrichshafen (DE); Markus Kaindl, Rohrbach (DE); Jürgen Gebert, Freising (DE); Joachim Fröschl, Seefeld (DE)

(73) Assignees: ZF Friedrichshafen AG, Friedrichshafen (DE); Bayerische Motoren Werke Aktiengesellschaft, Munich (DE)

( * ) Notice: Subject to any disclaimer, the term of this patent is extended or adjusted under 35 U.S.C. 154(b) by 251 days.

(21) Appl. No.: 10/914,957

(22) Filed: Aug. 10, 2004

(65) Prior Publication Data

US 2005/0038577 A1 Feb. 17, 2005

(30) Foreign Application Priority Data

Aug. 12, 2003 (DE) ............................. 103 37 002

(51) Int. Cl.
*B60K 6/20* (2007.10)
(52) U.S. Cl. .................... 701/22; 701/99; 180/65.2; 180/65.3; 903/924; 903/926
(58) Field of Classification Search .............. 903/924, 903/926; 701/22, 99; 180/65.2, 65.3
See application file for complete search history.

(56) References Cited

U.S. PATENT DOCUMENTS 5,373,219 A * 12/1994 Grabowski et al. .......... 318/139

(Continued)

FOREIGN PATENT DOCUMENTS

DE 43 44 053 A1 7/1994

(Continued)

OTHER PUBLICATIONS

David Friedman. A New Road: The technology and potential of hybrid vehicles. Union of Concerned Scientists. Cambridge, MA. Jan. 2003. http://www.hybridcenter.org/hybrid-center-a-new-road-report.html.*

(Continued)

*Primary Examiner*—Jack W Keith
*Assistant Examiner*—Ari M Diacou
(74) *Attorney, Agent, or Firm*—Davis Bujold & Daniels, P.L.L.C.

(57) ABSTRACT

A method for controlling and regulating the input power distribution of prime movers in a power train (1) of a motor vehicle which has one internal combustion engine (2), at least one electric machine (6, 14), at least one clutch (4, 11), the same as one transmission (12), and in which there is at least one control and regulation unit which, on the basis of predetermined, measuring and calculated values, controls and regulates the input power distribution between the internal combustion engine (2) and at least one electric machine (6, 14) with regard to power dynamics of the vehicle, the same as its energy consumption, its emission and its driving comfort. In addition, departing from a signalized input power wish, it is provided that existing nominal operating values for the operation of at least one electric machine (6, 14) is changed to new nominal operating values adapted to the actual input power wish and to changed operating situations of the vehicle and, that to determine the new nominal operating values for at least one electric machine (6, 14), the future maximum and minimum torques and outputs are precalculated, the same as the efficiency degree or losses thereof.

11 Claims, 1 Drawing Sheet

U.S. PATENT DOCUMENTS

| | | | |
|---|---|---|---|
| 5,788,004 A | | 8/1998 | Friedmann et al. |
| 5,789,882 A | | 8/1998 | Ibaraki et al. |
| 5,844,342 A | * | 12/1998 | Miyatani et al. ............ 310/114 |
| 5,984,033 A | | 11/1999 | Tamagawa et al. |
| 6,054,844 A | * | 4/2000 | Frank ........................... 322/16 |
| 6,110,066 A | * | 8/2000 | Nedungadi et al. ............. 475/5 |
| 6,209,672 B1 | * | 4/2001 | Severinsky ................. 180/65.2 |
| 6,278,915 B1 | | 8/2001 | Deguchi et al. |
| 6,304,809 B1 | * | 10/2001 | Cullen et al. .................. 701/93 |
| 6,307,276 B1 | * | 10/2001 | Bader ....................... 290/40 C |
| 6,359,419 B1 | * | 3/2002 | Verbrugge et al. .......... 320/132 |
| 6,453,228 B1 | * | 9/2002 | Shimada ...................... 701/89 |
| 6,588,256 B2 | * | 7/2003 | Gassner et al. ............... 73/116 |
| 6,745,117 B1 | * | 6/2004 | Thacher et al. ................ 701/50 |
| 6,864,663 B2 | * | 3/2005 | Komiyama et al. ......... 320/104 |
| 2001/0022166 A1 | * | 9/2001 | Yamaguchi et al. ...... 123/179.3 |
| 2002/0029624 A1 | * | 3/2002 | Gassner et al. ............. 73/117.3 |
| 2002/0052677 A1 | * | 5/2002 | Lasson et al. ................. 701/22 |
| 2002/0123836 A1 | | 9/2002 | Komiyama et al. |
| 2003/0037978 A1 | * | 2/2003 | Hofbauer ................... 180/65.4 |
| 2003/0102673 A1 | * | 6/2003 | Nada ........................ 290/40 C |
| 2003/0104899 A1 | * | 6/2003 | Keller ........................... 477/2 |
| 2004/0030469 A1 | * | 2/2004 | MacBain ..................... 701/22 |
| 2004/0035618 A1 | | 2/2004 | Grassl et al. |
| 2004/0140139 A1 | * | 7/2004 | Malik ........................ 180/65.2 |
| 2004/0231897 A1 | * | 11/2004 | Kimura et al. ............. 180/65.2 |

FOREIGN PATENT DOCUMENTS

| | | |
|---|---|---|
| DE | 195 05 431 A1 | 8/1996 |
| DE | 100 07 136 A1 | 9/2000 |
| DE | 199 38 623 A1 | 5/2001 |
| DE | 696 16 210 T2 | 6/2002 |
| DE | 697 05 984 T2 | 6/2002 |
| JP | 2005-254962 A | 9/2002 |
| WO | WO 02/26520 A1 | 4/2002 |

OTHER PUBLICATIONS

Charles Kittel and Herbert Kroemer. Thermal Physics 2nd Ed. W.H. Freeman and Co. San Francisco, CA. 1980. pp. 225-259.*

Halliday Resnick and Walker. Fundamentals of Physics 6th Ed. Wiley, New York, 2001. pp. 482-500.*

* cited by examiner

METHOD FOR CONTROL OF INPUT POWER DISTRIBUTION IN A MOTOR VEHICLE WITH HYBRID ENGINE DRIVE

This application claims priority from German Application Serial No. 103 37 002.1 filed Aug. 12, 2003.

FIELD OF THE INVENTION

The invention relates to a method for control of the input power distribution in a motor vehicle having hybrid engine drive.

BACKGROUND OF THE INVENTION

WO 02/26520 A1 has disclosed a power train control for a motor vehicle having at least two drive units and one transmission in the form of a hybrid engine drive. This power train has decentralized control units for producing adjusting signals for the prime mover and the transmission, the same as a pedal interpretation device for determining a torque nominal value from a parameter that characterizes the wish of the driver.

There is also a so-called state manager for establishing a nominal operating state of the power train according to the torque nominal value and to the state of charge of an energy memory, the same as a so-called torque manager for generating control signals for the decentralized control units according to the torque nominal value and to the established nominal operating state of the power train.

The publication further discloses that in the state manager a multiplicity of possible operating states of the power train are stored. The really possible operating states and the possible state transitions in a special motor vehicle are, at the same time, dependent on the configuration of the power train, that is, on the type and number of the components or units existing in this vehicle.

To utilize the power train control for different types of vehicles having differently configured power trains, said state manager has available one configuration expert which is adjusted according to the configuration of the power train. Depending on the adjustment of the configuration expert individual states can be locked or released.

It is disadvantageous in this power control that the utilization of firmly stored operating states, the same as the possible transitions thereof, when using the different prime movers, can lead to comparatively inaccurate results which are thus unsatisfactory relative to the power dynamics of the power train, the energy consumption, the emission and the driving comfort.

The problem on which the invention is based is, therefore, to introduce a method for control and regulation of a generic power train for a motor vehicle with which the power dynamics of the power train is improved, the energy consumption and the emission reduced, and the driving comfort increased.

SUMMARY OF THE INVENTION

The invention accordingly relates to a method for control and regulation of the input power distribution of prime movers in a power train of a motor vehicle to which belong an internal combustion engine, at least one electric machine operable as prime mover or as generator, at least one clutch and one transmission and, in which there is at least one control and regulation device which, on the basis of predetermined, measured and/or calculated values, controls and regulates the input power distribution between the internal combustion engine and at least one electric machine with regard to the power dynamics of the vehicle, its energy consumption, its emission and its drive comfort.

It is further provided that, departing from an input power wish better signalized by the vehicle driver, existing nominal operating values for the operation of at least one electric machine be changed to new nominal operating values adapted to the existing input power wish and/or changed operating situations of the vehicle and that to determine the new nominal operating values for at least one electric machine its maximum and minimum torques and/or outputs, the same as the efficiency degree and/or losses, are calculated in advance.

It is further a preferred component of the invention that for the precalculation of the future maximum and minimum torques and/or outputs, the same as the efficiency degree and/or losses, there are measuring values used from a previous control and/or regulation cycle.

One other development of the invention additionally provides that for the precalculation of the future maximum and minimum torques and/or outputs, the same as the efficiency degree and/or losses, the electric power loss $P_{loss}$ of at least one electric machine is determined.

For calculating concrete new nominal operating values, it can also be provided that such new nominal operating value $P_{EM\_nominal\_new}$ for one electric machine in the power train is calculated according to the equation $$P_{EM\_nominal\_new} = f(P_{loss}, P_{EM\_max}, P_{EM\_min}, P_{SP\_max}, P_{SP\_min})$$

wherein $P_{loss}$ stands for the actual electric power loss of one electric machine, $P_{EM\_max}$ and $P_{EM\_min}$ are the electric maximum and minimum outputs of the electric machine and $P_{SP\_max}$, the same as $P_{SP\_min}$, indicate the maximum and minimum charge state of an electric memory.

The electric power loss of the electric machine $P_{loss}$ results from the equation $$P_{loss} = (V_{EM} * I_{EM} - P_{EM\_nominal}) * \frac{P_{EM\_nominal}}{P_{EM\_actual}}$$

wherein the $V_{EM}$ is the connection voltage of the electric machine, $I_{EM}$ stands for the electric current in the electric machine, $P_{EM\_actual}$ means the mechanical actual power and $P_{EM\_nominal}$ the mechanical nominal power of the electric machine.

BRIEF DESCRIPTION OF THE DRAWINGS

The invention will now be described, by way of example, with reference to the accompanying drawings in which:

DETAILED DESCRIPTION OF THE INVENTION

Figure 1:
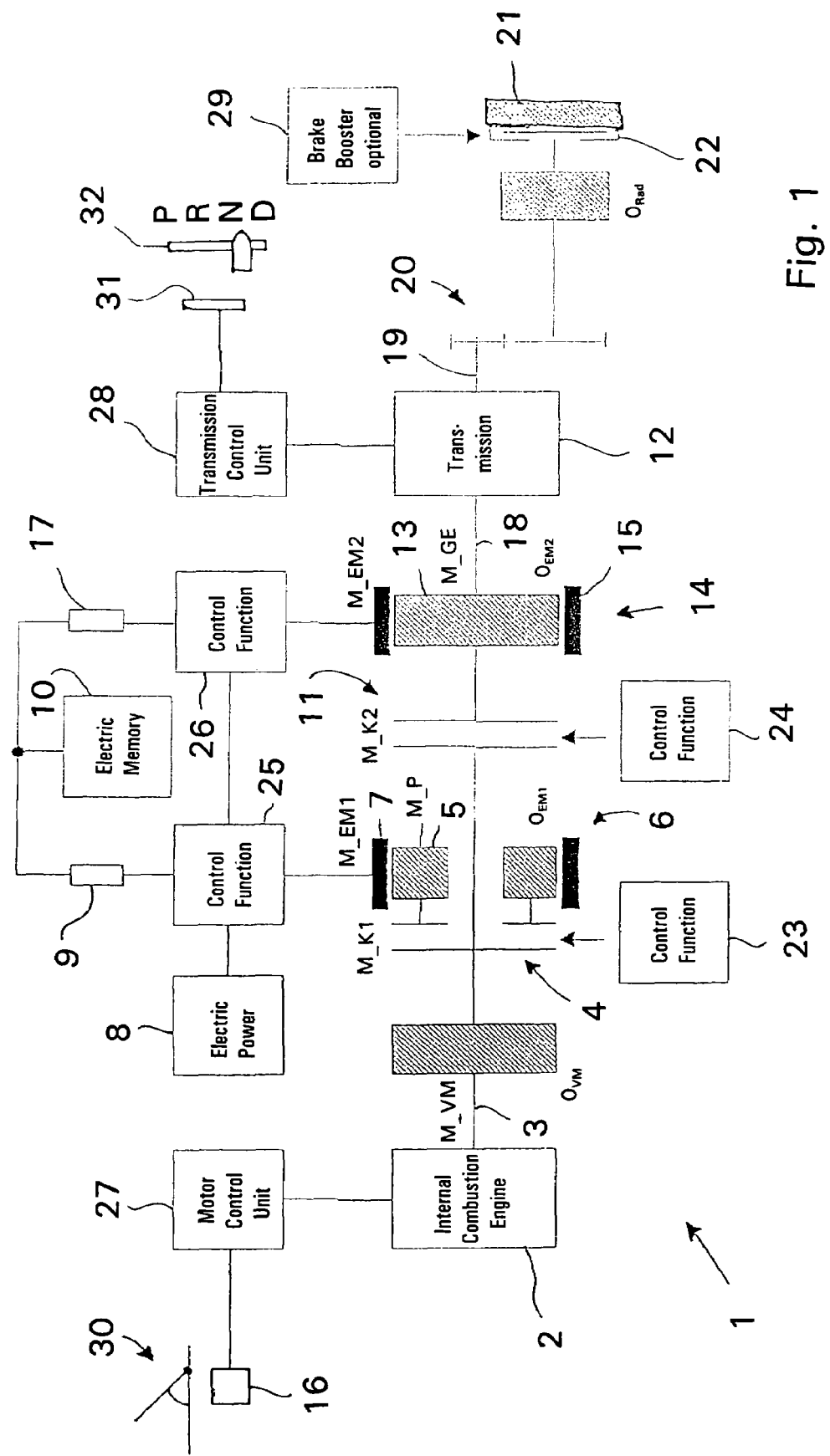

As it can be understood from the enclosed single Figure, the inventive control and regulation method serves for control and regulation of components of a hybrid power train 1 given by way of example in which, in a manner known per se, an internal combustion engine 2 generates a torque M_VM and, via its crankshaft 3, relays a first clutch 4 to the input side. The output side of the first clutch 4 is connected with a rotor 5 of a first electric machine 6 so that a closing of the first clutch 4, while the internal combustion engine 2 is running, leads to a rotation of the rotor 5 as consequence of which an electric current is generated in a stator 7 of the first electric machine 6. The current can be guided into an electric vehicle main power system 8 and or, via a first power resistance 9, into an electric memory 10 for electric energy from which it can again be recalled as needed. The electric memory 10 can be a high output capacitor, a conventional vehicle batter, a NiMH3 battery, a lithium-ion battery or any other high power battery or also a flywheel mass.

The input side of the first clutch 4 is, in addition, connected directly with the input side of a second clutch 11 which, operated as a separating clutch, can separate the internal combustion engine 2 from a transmission 12 on the output side.

The output side of the second clutch 11 is non-rotatably connected with a rotor 13 of a second electric machine 14 so that during an input by the internal combustion engine 2 while the clutches 4, 11 are closed or during an input by a vehicle wheels 21 via the transmission 12 while the second clutch 11 is open, in a coasting propulsion phase, in a stator 15 of the second clutch 11, an electric current is produced which can be guided into the main power system 8 and/or via a second power resistance 17 into the memory 10 for electric energy.

Both electric machines 6, 14 are preferably designed as synchronous or as asynchronous machines and preferably serve in the vehicle as prime mover, as starter and as generator.

The rotor 13 of the second electric machine 14 is non-rotatably connected with a transmission input shaft 18 of the already mentioned transmission 12, which transmission 12 is designed as automated mechanical transmission or as automatic transmission (continuously variable transmission or multi-step automatic transmission).

In this embodiment, an output shaft 19 of the transmission 12 is connected via a differential transmission 20 and input shafts (not shown) with drive wheels of which, for more clarity, only one drive wheel 21 is shown here. The drive wheels 21 can be decelerated by means of a service brake 22.

As can be understood from the graph, both clutches 4, 11 are controlled and regulated in their operating characteristics with the aid of two control functions 23, 24. These control functions 23, 24 are preferably stored as software in an electronic control and regulation unit. This transmission control and regulation unit (not separately shown for better clarity), is connected with clutch actuation actuators (not shown) on the clutches 4, 11 via control lines. For control and regulation of both electric machines 6, 14, control functions 25, 26 are provided which are also stored in the control and regulation unit already mentioned or in a separate one.

Furthermore, the internal combustion engine 2 and the transmission 12 are also controlled and regulated in their operating characteristics according to predetermined control and regulation functions stored here in a motor control unit 27 and in a transmission control unit 28. To detect the torque desired by the vehicle driver, the motor control unit 27 is connected with an accelerator pedal sensor 16 which detects the bevel and the adjustment speed of an accelerator pedal 30 of the vehicle. Besides, the transmission control unit 28 is connected with a selector lever sensor 31 by which can be adjusted the ratio and/or travel stage wish P, R, N, D, signalizable by a shifting and/or selector device 32.

Finally this exemplary power train 1 also has an electronically controlled brake device 29 available with which can be triggered and/or assisted (brake assistant) a braking operation of the service brake 22 dependent on the driver's wish and travel situation.

It is obvious for the knowledgeable expert of the invention that the control and regulation functions can also be stored in a common central control unit which is in signal communication with the sensors and actuators.

Coordinated with this power train can also other sensors which, for the sake of more clarity, are not explicitly plotted in the Figure. Instead of them, physico-technical parameters are indicated which are detected by the sensors or calculated on the basis of their measuring values and fed to one or more of the control and regulation unit for performing the functions thereof. To the measuring values belong the torque M_VM of the Internal combustion engine 2, the same as its efficiency degree $\Theta_{VM}$, the clutch torques M_K1 and M_K2 of both clutches 4, 11, the input torques M_EM1 and M_EM2 and the efficiency degrees $\Theta_{EM1}$ and $\Theta_{EM2}$ of the two electric machines 6, 14, the efficiency degree $\Theta_{Rad}$ of the torque transmission to the vehicle wheels 21 and the input torque M_GE in the transmission input shaft 18.

A plurality of operating parameters have to be taken into account for the optimal manner of operation of such power train with regard to the power dynamics, the energy consumption, the emission and the driving comfort. It is to be borne in mind here that the vehicle equipped with said power train can be operated purely by electric motor, purely by internal combustion engine, or also in combination considering the utilization of the prime mover.

Therefore, to said operating parameters naturally belongs together with the driver's wish for a certain input torque, taking into account the travel situation. The expression travel situation must also cover in this connection, for example, driving range features such as depressions, flat surface or gradient, state of charge of the electric energy memory 10, the particular requirements and the total need of electric energy of the electric consumers in the vehicle, the operating mode of the two electric machines 6, 14, the same as of the internal combustion engine 2 and the shifting state of both clutches 4, 11.

Relative to this, in order to be able now to carry out in the power train 1 an optimal power distribution among the internal combustion engine 2, the first electric machine 6 and the second electric machine 14, there must be known per se the maximum and minimum torques and/or outputs, the same as the efficiency degree and/or losses in both electric machines 6, 14 and in the internal combustion engine 2.

In order to be able from these and other values to determine for said prime movers 2, 6, 14 nominal operating values suited to the operating situation, these must be calculated in advance. But this wish encounters the problem that the input values needed for the purpose either do not exist or can be analytically or empirically determined only by very costly calculation methods.

In solution of this problem, the invention provides that from measuring values of a previous control and regulation cycle, the missing parameters are deduced. As measuring values for determining the necessary nominal operating values serve, for example, the voltage drop in the electric machine 6, 14 observed and/or the current consumption values thereof.

By this procedure is accomplished a dynamic and targeted optimal input power distribution between the input power of the internal combustion engine 2 and the two electric machines 6, 14. At the same time, it is very advantageously possible to react to the mode of operation precisely selected (by internal combustion engine with operation of the electric machines 6, 14 as generators; purely by electric motor; combined electric motor/internal combustion engine, among others) and to the wishes for changes of modes of operation.

Herebelow is shown an example how such nominal operation value is determined.

In this example, the former electric nominal power $P_{EM\_nominal}$ of one of the electric machines is already known.

What is sought is a new nominal value $P_{EM\_nominal\_new}$ for the mechanical power of this electric machine. Also known is that the new nominal value $P_{EM\_nominal\_new}$ can be determined from the values for the maximum mechanical electric power $P_{EM\_max}$ and the minimum electric power $P_{EM\_min}$ of the electric machine being observed, the same as from the values for the maximum and minimum electric powers $P_{SP\_max}$, $P_{SP\_min}$ of the electric memory 10 and of the electric power loss $P_{loss}$ in this electric machine. This can be expressed by the equation $$P_{EM\text{-}nominal\_new} = f(P_{loss}, P_{EMmax}, P_{EM\_min}, P_{SP\_max}, P_{SP\_min}) \quad (I)$$

Since $P_{EM\_max}$, $P_{EM\_min}$, $P_{SP\_max}$ and $P_{SP\_min}$ are known, to determine the new nominal operating value $P_{EM\_nominal\_new}$, what is accordingly sought as a single unknown is the electric power loss $P_{loss}$ in the electric machines 6, 14.

To solve this problem, use is made of a pattern analysis according to which the electric power loss $P_{loss}$ of the electric machine results from the former electric nominal power $P_{EM\_nominal}$, the angular velocity ω_EM of the rotor 5, 13, the connection voltage $V_{EM}$ and the temperature T_EM of the electric machine.

In an approximate solution of this problem there applies, for small nominal value changes of the measuring parameters, connection voltage $V_{EM}$ and input current of the machine $I_{EM}$, the knowledge that the electric power loss $P_{loss}$ in the electric machine can be calculated from the difference between the electric actual power $P_{EM\_al\_actual}$ and the mechanical actual power $P_{EM\_actual}$ of the electric machine. There accordingly applies $$P_{EM\_actual} = V_{EM} * I_{EM} - P_{EM\_actual} \quad (II)$$

with $$P_{EM\_actual} = M\_EM\_IST * \omega\_EM \quad (III)$$

with M_EM_IST for the actual torque in the electric machine observed.

Therefore also applies $$P_{EM\_nominal} = V_{EM} * I_{EM} - P_{EM\_nominal} \quad (IV)$$

and $$P_{EM\_nominal} = M\_EM\_Soll * \omega\_EM. \quad (V)$$

On this basis an extrapolation equation results for the sought power loss $P_{loss}$ by way of example of the electric machine as follows:

$$P_{loss} = (V_{EM} * I_{EM} - P_{EM\_actual}) * \frac{P_{EM\_nominal}}{P_{EM\_actual}} \quad (VI)$$

The value thus calculated for $P_{loss}$ can then be introduced in the equation (I) thus being calculated the new nominal value $P_{EM\_nominal\_new}$ for the electric machine. As already mentioned, this constitutes a new nominal operating value for control and regulation of the electric machines 6, 14 selected here by way of example in the sense of an optimal input power distribution between the internal combustion engine 2 and the two electric machines 6, 14.

REFERENCE NUMERALS

1 power train
2 internal combustion engine
3 crankshaft
4 first clutch
5 rotor
6 first electric machine 22 service brake
7 stator
8 electric power
9 power resistance
10 electric memory
11 second clutch
12 transmission
13 rotor
14 second electric machine
15 stator
16 accelerator pedal sensor
17 power resistance
18 transmission input shaft
19 transmission output shaft
20 differential transmission
21 vehicle wheel
23 control functions
24 control functions
25 control functions
26 control functions
27 motor control unit
28 transmission control unit
29 electronically controlled brake device
30 accelerator pedal
31 selector lever sensor
32 shift and/or selector device

The invention claimed is:

1. A method for control and regulation of input power distribution of at least one primer mover in a power train (1) of a vehicle which has at least one internal combustion engine (2), at least one electric machine (6, 14) operable as at least one of a prime mover or as a generator, at least one clutch (4, 11) and a transmission (12) and in which there is at least one control and regulation unit for controlling and regulating the input power distribution to the transmission between said internal combustion engine (2) and the at least one electric machine (6, 14) with regard to power dynamics of the vehicle, energy consumption of the vehicle, emission and driving comfort of the vehicle, the method comprising the steps of:

receiving at least one of a driver's signalized input power requirement and an operating state of the vehicle;

reading at least one previously calculated stored nominal operating value for at least one of the electric machine and an electric storage device connected with the electric machine;

determining a current power loss of the at least one of the electric machine and the electric storage device based on the previously calculated nominal operating values;

calculating a current maximum and minimum output power of the at least one of the electric machine and the electric storage device and calculating a new at least one nominal operating value for the at least one of the electric machine and the electric storage device;

distributing the driver's signalized input power requirement between the input power of the combustion engine and the at least one of the electric machine and the electrical storage device according to the new nominal operating value for the at least one of the electric machine and the electrical storage device; and storing the new at least one nominal operating value for the at least one of the electrical machine and the electrical storage device as a next at least one previously calculated stored nominal operating value for the at least one of the electric machine and the electrical storage device.

2. The method according to claim 1, wherein a new nominal operating value $P_{EM\_nominalnew}$ for an electric machine (6, 14) is calculated in said power train (1) according to an equation $$P_{EM\_nominal\_new} = f(P_{loss}, P_{EM\_max}, P_{EM\_min}, P_{SP\_max}, P_{SP\_min})$$

where $P_{loss}$ stands for the actual power loss of one electric machine (6, 14), $P_{EM\_max}$ and $P_{EM\_min}$ are the electric maximum and minimum outputs of said electric machines (6, 14) and $P_{SP\_max}$, the same as $P_{SP\_min}$, indicate the maximum and minimum state of charge of one electric memory (10).

3. A method for control and regulation of input power distribution of a prime mover in a power train (1) of a vehicle which has at least one internal combustion engine (2) at least one electric machine (6, 14) operable as at least one of a prime mover or as a generator, at least one clutch (4, 11) and a transmission (12) and in which there is at least one control and regulation unit which, on the basis of at least one of predetermined measured and calculated values, controlling and regulating the input power distribution to the transmission between the internal combustion engine (2) and the electric machine (6, 14) with regard to power dynamics of the vehicle, energy consumption of the vehicle, emission and driving comfort of the vehicle;

departing from a signalized input power wish, existing nominal operating values for operating the at least one electric machine (6, 14) are changed to new nominal operating values adapted to one or more of an actual input power wish and changed operating situations of the vehicle; and to determine the new nominal operating values for the at least one electric machine (6, 14), pre-calculating maximum and minimum torques of the at least one electric machine (6, 14) and correlated with the efficiency degree and power losses of the at least one electric machine (6, 14), wherein a new nominal operating value $P_{EM\_nominal\_new}$ for an electric machine (6, 14) is calculated in said power train (1) according to an equation:

$$P_{EM\_nominal\_new} = f(P_{loss}, P_{EM\_max}, P_{EM\_min}, P_{SP\_max}, P_{SP\_min})$$

in which $P_{loss}$ stands for the actual power loss of one electric machine (6, 14), $P_{EM\_max}$ and $P_{EM\_min}$ are the electric maximum and minimum outputs of the at least one electric machine (6, 14) and $P_{SP\_max}$ and $P_{SP\_min}$ indicate the maximum and minimum state of charge of one electric memory (10); and the electric power loss of the electric machine (6, 14) $P_{loss}$ results from the following equation:

$$P_{loss} = (V_{EM} * I_{EM} - P_{EM\_nominal}) * \frac{P_{EM\_nominal}}{P_{EM\_actual}}$$

in which $V_{EM}$ is a connection voltage of the electric machine (6, 14), $I_{EM}$ stands for an electric current in the electric machine, $P_{EM\_actual}$ is a mechanical actual power and $P_{EM\_nominal}$ is a mechanical nominal power of the electric machine (6, 14).

4. The method according to claim 3, wherein for pre-calculating the future maximum and minimum torque and/or outputs, the same as the efficiency degree and/or losses, use is made of measured values from one or several of the prior control and/or regulation cycles.

5. The method according to claim 3, wherein for precalculating the one or more of the future maximum and minimum torques and outputs, the same as the one or more of the efficiency degree and losses, an electric power loss $P_{loss}$ of one electric machine (6, 14) is determined.

6. A method for controlling the input power distribution to a vehicle transmission between at least one internal combustion engine (2) and at least one electric machine (6, 14) in a vehicle having at least one controller unit for carrying out the method according to the steps of:

connecting the at least one internal combustion engine (2) and the at least one electric machine (6, 14) in parallel with the vehicle transmission to enable input power distribution to the vehicle transmission from both the internal combustion engine (2) and the at least one electric machine (6, 14)

controlling the input power distribution between said internal combustion engine (2) and the at least one electric machine (6, 14) via the controller unit according to power dynamics of the vehicle, energy consumption of the vehicle, emission and driving comfort of the vehicle by the further steps of:

obtaining a driver's signalized input power requirement and an operating state of the vehicle;

recalling known previously calculated stored nominal operating values for the at least one electric machine (6, 14);

determining a current power loss of the at least one electric machine based on the previously calculated known nominal operating values of the at least one electric machine;

precalculating a current maximum and minimum output power of at least one of the at least one electric machine and an electrical storage unit for the at least one electric machine and deducing a new nominal operating value for the at least one electric machine (6, 14) as a function of the current power loss and the precalculated current maximum and minimum output power the at least one of the at least one electric machine the electrical storage device;

distributing the driver's signalized input power requirement between the input power of the combustion engine and the at least one electric machine or electrical storage device according to the new nominal operating value for the at least one electric machine (6, 14); and storing the new nominal operating value for the at least one electrical machine as a next previously calculated stored nominal operating value for the at least one electric machine (6, 14).

7. The method according to claim 6, further comprising the step wherein the new nominal operating value $P_{EM\_nominal\_new}$ for the at least one electric machine (6, 14) is calculated according to an equation:

$$P_{EM\_nominal\_new} = f(P_{loss}, P_{EM\_max}, P_{EM\_min}, P_{SP\_max}, P_{SP\_min})$$

wherein $P_{loss}$ stands for the actual power loss of the at least one electric machine (6, 14), $P_{EM\_max}$ and $P_{EM\_min}$ are the electric maximum and minimum outputs of said electric machines (6, 14) and $P_{SP\_max}$, and $P_{SP\_min}$, indicate the maximum and minimum state of charge of an electric storage unit (10).

8. A method for controlling the input power distribution to a vehicle transmission between at least one internal combustion engine (2) and at least one electric machine (6, 14) in a vehicle having at least one controller unit for carrying out the method according to the steps of:

connecting the at least one internal combustion engine (2) and the at least one electric machine (6, 14) in parallel with the vehicle transmission to enable input power distribution to the vehicle transmission from both the internal combustion engine (2) and the at least one electric machine (6, 14);

controlling the input power distribution between the internal combustion engine (2) and the at least one electric machine (6, 14), via the controller unit, according to power dynamics of the vehicle, energy consumption of the vehicle, emission and driving comfort of the vehicle by the further steps of:

obtaining a driver's signalized input power requirement and an operating state of the vehicle;

recalling known nominal operating values for the at least one electric machine (6, 14);

determining a power loss of the at least one electric machine based on the known nominal operating values of the at least one electric machine;

precalculating a maximum and a minimum output power of the at least one electric machine or an electrical storage unit and deducing a new nominal operating value for the at least one electric machine (6, 14) as a function of the power loss and the precalculated maximum and minimum output power of the at least one electric machine or an electrical storage device; and distributing the driver's signalized input power requirement between the input power of the combustion engine and the at least one electric machine or electrical storage device according to the new nominal operating value for the at least one electric machine (6, 14);

wherein the new nominal operating value $P_{EM\_nominal\_new}$ for the at least one electric machine (6, 14) is calculated according to an equation:

$$P_{EM\_nominal\_new} = f(P_{loss}, P_{EM\_max}, P_{EM\_min}, P_{SP\_max}, P_{SP\_min})$$

in which $P_{loss}$ stands for the actual power loss of the at least one electric machine (6, 14), $P_{EM\_max}$ and $P_{EM\_min}$ are the electric maximum and minimum outputs of the at least one electric machine (6, 14) and $P_{SP\_max}$, and $P_{SP\_min}$, indicate the maximum and minimum state of charge of an electric storage unit (10) and the electric power loss of the electric machine (6, 14) $P_{loss}$ results from the following equation:

$$P_{loss} = (V_{EM} * I_{EM} - P_{EM\_nominal}) * \frac{P_{EM\_nominal}}{P_{EM\_actual}}$$

in which $V_{EM}$ is a connection voltage of the electric machine (6, 14), $I_{EM}$ stands for an electric current in the electric machine, $P_{EM\_actual}$ is a mechanical actual power and $P_{EM\_nominal}$ is a mechanical nominal power of the electric machine (6, 14).

9. The method according to claim 8, further comprising the step of precalculating the maximum and minimum output power of the at least one electric machine by obtaining measured values from at least one of a prior input power distribution control cycle.

10. The method according to claim 8, further comprising the step of wherein for precalculating the maximum and minimum output power, an electric power loss $P_{loss}$ of one electric machine (6, 14) is determined.

11. A method for control and regulation of input power distribution of power train components (1) of a vehicle, the power train components including at least an internal combustion engine (2) at least one electric machine (6, 14) operable as at least one of a prime mover and as a generator, at least one clutch (4, 11) and one transmission (12) and in which there is at least one control and regulation unit, comprising the steps of:

reading at least one stored previously calculated nominal operation value for the at least one electric machine;

receiving at least one of a signalized input power demand from a vehicle operator and a change in an operating stated of the vehicle, calculating at least a current power loss value of the at least one electrical machine based on the at least one stored previously calculated nominal operation value, and determining at least one new nominal operation value for the at least one electric machine (6, 14) by calculating maximum and minimum torques of the at least one electric machine (6, 14) according to a change in at least one of an efficiency and a power loss of the at least one electric machine (6, 14) where the at least one of the efficiency and the power loss are determined from measurement data from a previous control cycle, controlling and regulating an input power distribution to the transmission between said internal combustion engine (2) and the at least one electric machine (6, 14) with regard to power dynamics of the power train components, energy consumption of the power train components, emissions of the power train components and driving comfort of the vehicle, and storing the new least one nominal operating value for the at least one electrical machine as a next stored previously calculated nominal operating value.

* * * * *